United States Patent [19]
Bartmann

[11] Patent Number: 5,236,075
[45] Date of Patent: Aug. 17, 1993

[54] ESCALATOR BROKEN ROLLER DETECTOR

[76] Inventor: Horst M. Bartmann, 1045 Kapunapuna Way, Honolulu, Hi. 96825

[21] Appl. No.: 864,321

[22] Filed: Apr. 6, 1992

[51] Int. Cl.⁵ .............................................. B65G 43/00
[52] U.S. Cl. ..................................... 198/323; 198/496; 198/810
[58] Field of Search ........................ 198/323, 496, 810

[56] References Cited
U.S. PATENT DOCUMENTS

| | | | |
|---|---|---|---|
| 3,297,127 | 1/1967 | Dennerlein | 198/323 |
| 3,580,376 | 5/1971 | Loshbough | 198/323 |
| 4,678,075 | 7/1987 | Bowman | 198/496 |
| 4,863,006 | 9/1989 | Kotkata et al. | 198/323 |
| 5,025,527 | 6/1991 | Armstrong | 198/496 |

Primary Examiner—Joseph E. Valenza
Attorney, Agent, or Firm—Leon Gilden

[57] ABSTRACT

The detector is designed to sense one or more broken rollers on an escalator, and then to automatically shut down the escalator to prevent damage or injury. Dual proximity sensors are positionable proximate a roller path so as to sense the outside diameter of each roller as the roller passes close to the sensors when the escalator is in motion. As long as each roller is intact, the sensors will transmit a symmetrical time pulse signal. A broken roller will fall away from its spool and no longer trigger the sensors, and the resulting interruption will interrupt the symmetry and turn off the escalator.

5 Claims, 5 Drawing Sheets

ESCALATOR BROKEN ROLLER DETECTOR

BACKGROUND OF THE INVENTION

1. Field of the Invention

The present invention relates to safety devices, and more particularly pertains to sensing mechanisms for detecting the presence of broken escalator rollers.

2. Description of the Prior Ar

As can be appreciated, a broken roller on an escalator is very dangerous and will allow an escalator step to drop to an abnormally low position as it passes under the step combs. This creates a gap into which a person's foot can be wedged or trapped whereby serious injury may result. In extreme cases, the escalator steps can open up a gap large enough to cause the death of a user. As such, there is a continuing need for new and improved devices and methods for determining when escalator rollers break and in this respect, the present invention substantially fulfills this need.

SUMMARY OF THE INVENTION

In view of the foregoing disadvantages inherent in the known types of safety devices for escalators now present in the prior art, the present invention provides an improved broken roller detection device construction wherein the same can be utilized on an escalator to facilitate an automatic shut down of said escalator in the event of a malfunction. As such, the general purpose of the present invention, which will be described subsequently in greater detail, is to provide a new and improved broken roller detector for an escalator which has all the advantages of the prior art broken roller detectors and none of the disadvantages.

To attain this, the present invention essentially comprises a detector which is designed to sense one or more broken rollers on an escalator, and to then automatically shut down the escalator to prevent damage or injury to users. Dual proximity sensors are positionable proximate a roller path so as to sense the outside diameter of each roller as the roller passes close to the sensors when the escalator is in motion. As long as each roller is intact, the sensors will transmit a symmetrical time pulse signal. A broken roller will fall away from its spool and no longer trigger the sensors, and the resulting interruption will interrupt the symmetry and turn off the escalator.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved escalator broken roller detector which has all the advantages of the prior art escalator broken roller detectors and none of the disadvantages.

It is another object of the present invention to provide a new and improved escalator broken roller detector which may be easily and efficiently manufactured and marketed.

It is a further object of the present invention to provide a new and improved escalator broken roller detector which is of a durable and reliable construction.

An even further object of the present invention is to provide a new and improved escalator broken roller detector which is susceptible of a low cost of manufacture with regard to both materials and labor, and which accordingly is then susceptible of low prices of sale to the consuming public, thereby making such escalator broken roller detectors economically available to the buying public.

Still yet another object of the present invention is to provide a new and improved escalator broken roller detector which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
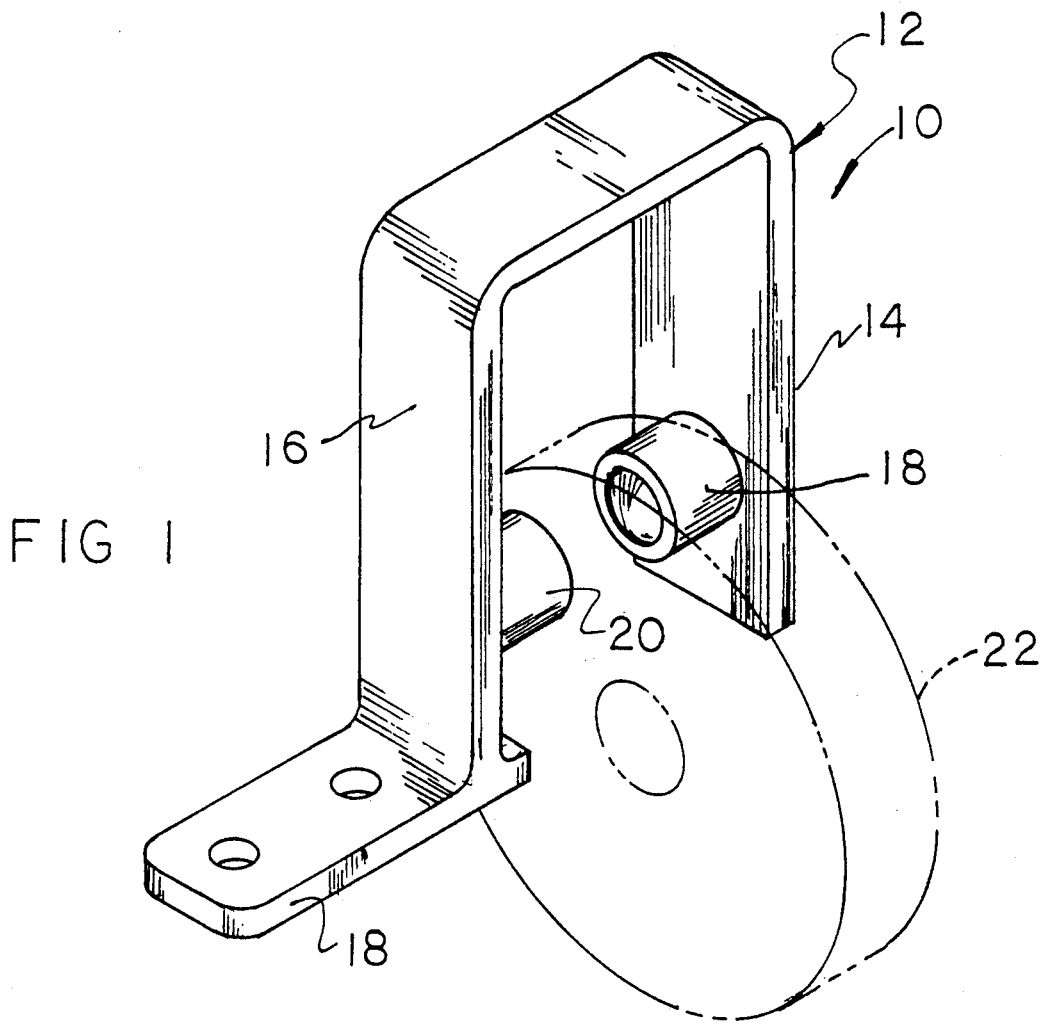
FIG. 1 is a perspective view of a first embodiment of the escalator broken roller detector comprising the present invention.

With reference now to the drawings, and in particular to FIG. 1 thereof, a first embodiment of a new and improved escalator broken roller detector construction embodying the principles and concepts of the present invention and generally designated by the reference numeral 10 will be described.

More specifically, it can be seen that the embodiment 10 includes a U-shaped housing structure 12 having first and second integrally attached, aligned arms 14, 16 and an integral attachment bracket 18 attached to the arm 16. The structure 12 can be formed of a plastic or other lightweight material, and appropriate electrical leads may be retained therein so as to be concealed from sight and to prevent damage by a moving escalator. Respectively mounted on interior portions of the arms 14, 16 are a pair of conventional sensors 18, 20 which are designed to send and receive signals therebetween and which are positionable on opposite sides of a moving escalator roller 22.

Figure 2:
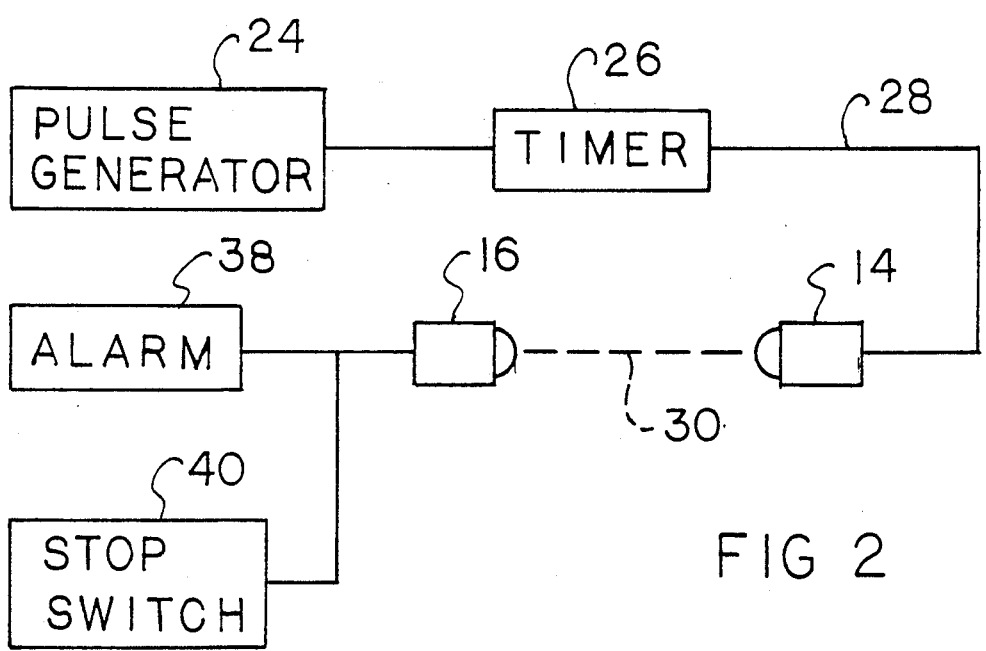
FIG. 2 is a representative electrical schematic utilizable in the construction of the present invention.
Figure 3:
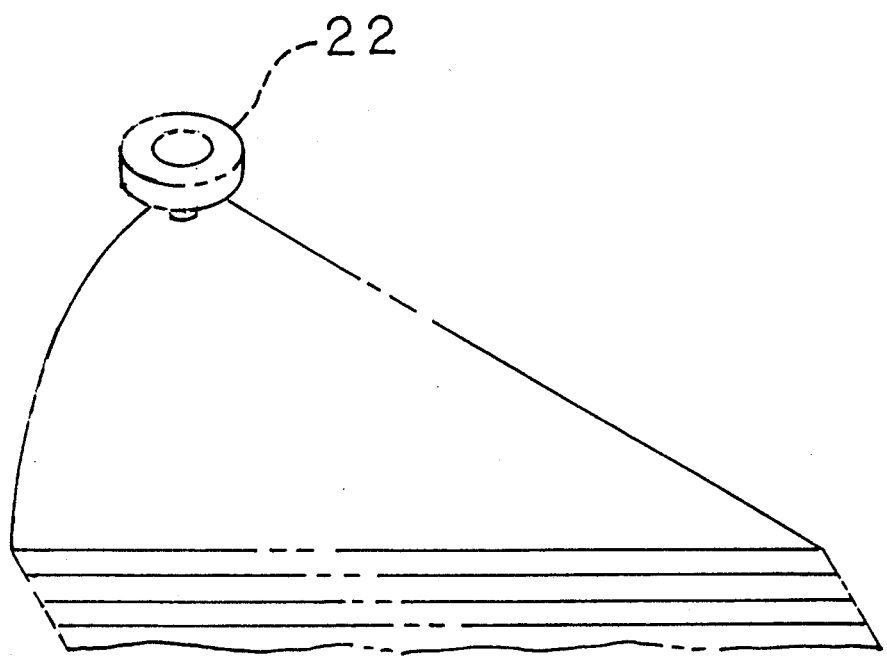
FIG. 3 is a perspective view illustrating an escalator roller.
Figure 4:
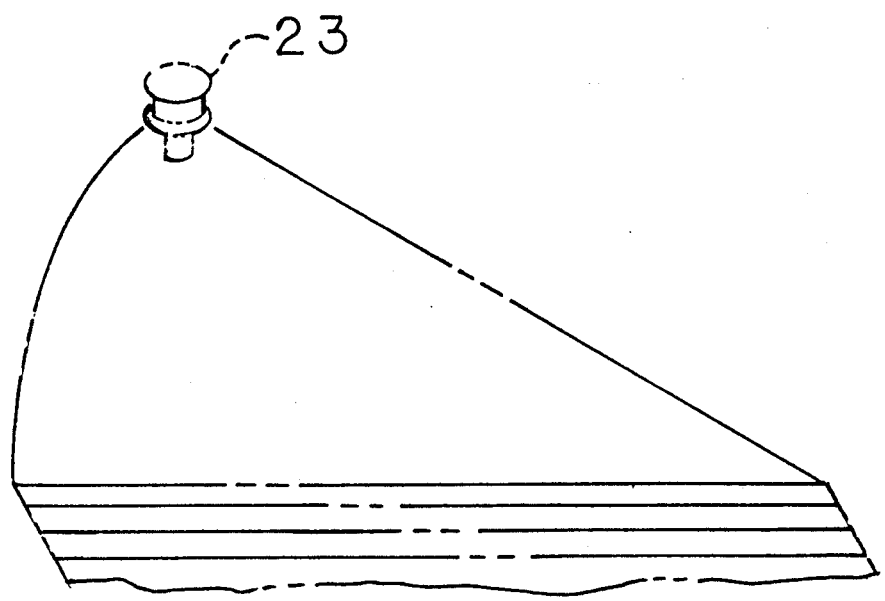
FIG. 4 is a perspective view illustrating a broken escalator roller.
Figure 5:
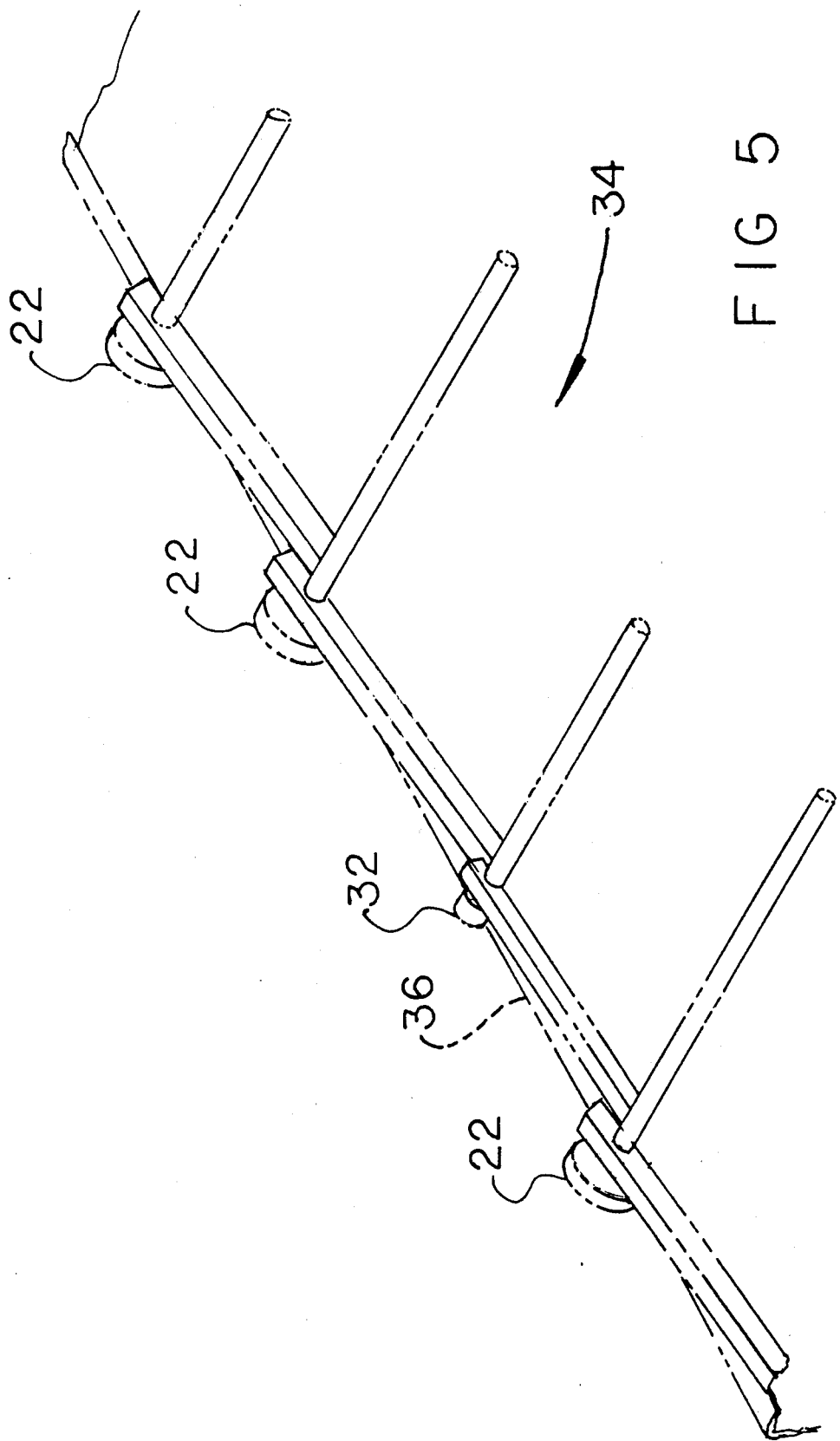
FIG. 5 is a perspective view further illustrating a broken escalator roller.

FIG. 2 is a very basic representation of a number of different electrical circuits which could be employed to carry out the function of the present invention. Recognizing the fact that the sensors 14, 16, which could be photo detectors or the like, are positionable on opposed sides of a moving roller 22, a conventional pulse generator circuit 24 may either be timed or combined with a variable timer 26 to send a signal to the first sensor/detector 14. Provided that the generated signal to the electrical lead 28 is timed with escalator movement whereby a roller 22 is positioned between the sensors 14, 16, no signal will be received by the detector 16 if an unbroken roller blocks the generated signal 30. In this regard, FIG. 3 illustrates an unbroken roller 22 while FIG. 4 illustrates the spool 32 which remains after a roller has broken and fallen away from the spool. Similarly, FIG. 5 illustrates a moving escalator assembly 34 wherein a plurality of functioning rollers 22 are illustrated along with a broken roller 32. This FIG. 5 illustrates how the escalator assembly 34 may drop a step downwardly within a track 36 as the result of a missing roller 22.

With continuing reference to FIG. 2 then, it can be appreciated that if only a spool 32 is present between the sensors/detectors 14, 16, the signal 30 will pass over the spool and be detected by the detector 16 which then can alternatively or concurrently activate an alarm 38 and an escalator stop switch 40 in a conventional and well known manner.

Figure 6:
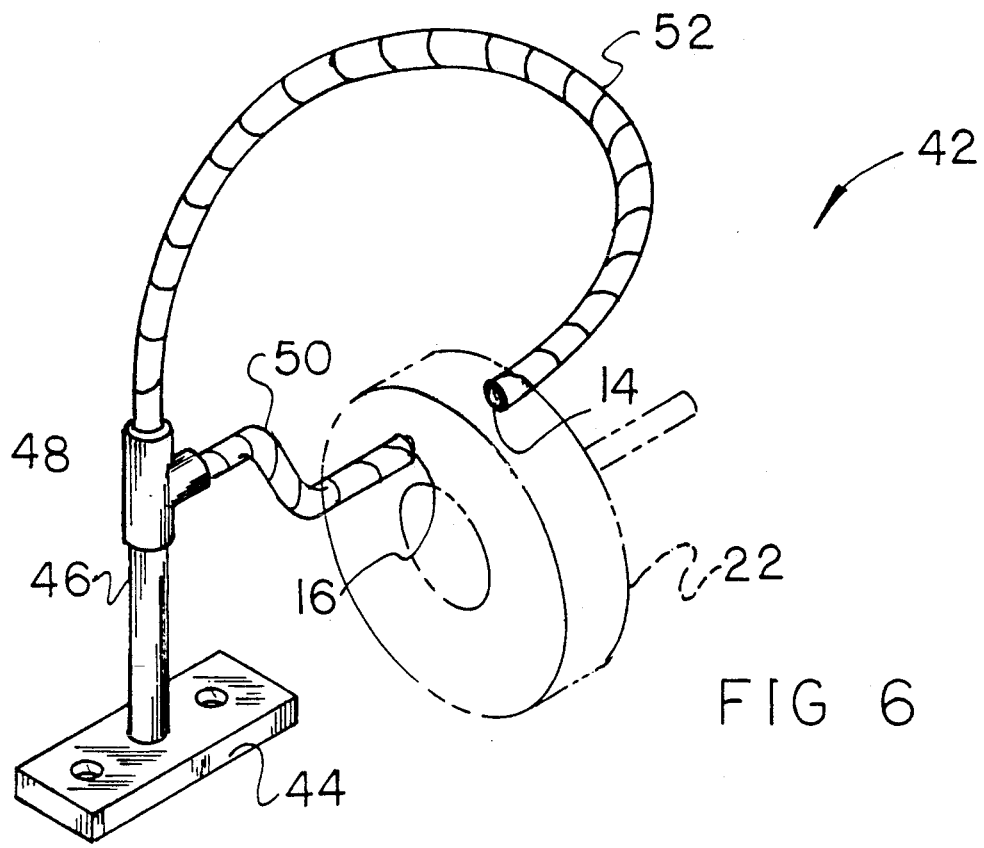
FIG. 6 is a perspective view of a second embodiment of the invention.

FIG. 6 of the drawings illustrates a modified embodiment of the invention which is generally designated by the reference numeral 42. This embodiment 42 includes a T-shaped mounting bracket 44 which is fixedly securable in a conventional manner proximate a moving escalator assembly and which includes an upstanding hollow conduit 46 through which appropriate electrical leads can be directed. The top of the conduit 46 includes a tee 48 out of which a pair of flexibly bendable metal arms 50, 52 respectively extend. The aforedescribed sensor 14 is mounted in an end of the arm 52 and the sensor/detector 16 is mounted in an end of the arm 50. This embodiment 42 is adaptable for use with various sized rollers 22 in unillustrated escalator assemblies 34 due to the fact that the sensors 14, 16 can be moved to their most advantageous positions by the respective bending and positioning of the arms 52, 50.

Figure 7:
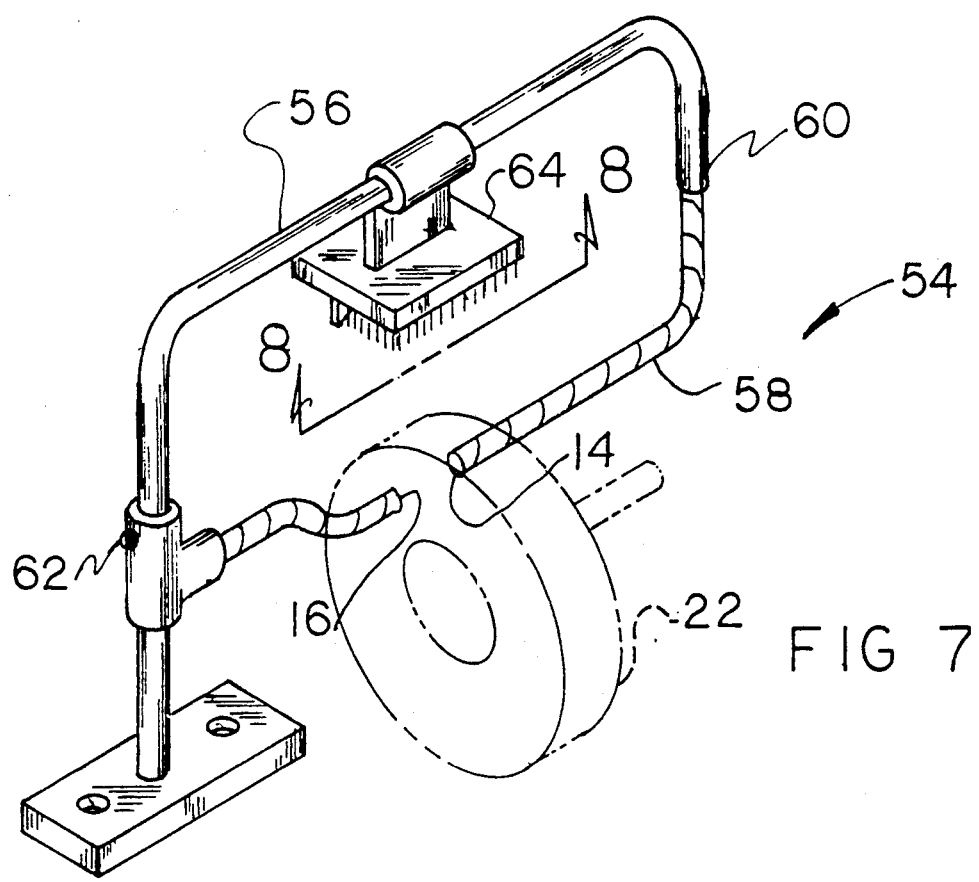
FIG. 7 is a perspective view of a third embodiment of the invention.

FIG. 7 of the drawings illustrates a third embodiment of the invention which is generally designated by the reference numeral 54. The embodiment 54 is substantially similar to the embodiment 42 with the exception that the flexible arm 52 has been replaced with a rigid U-shaped conduit member 56. A second flexible arm 58 extends out of an end 60 of the member 56 and facilitates the selective positioning of the sensor 14 so as to have it aligned with the sensor 16 in a now understood manner. A setscrew 62 facilitates the up and down positioning of the arm member 56 so as to bring a roller cleaning brush 64 into engagement with a roller 22 when desired.

Figure 8:
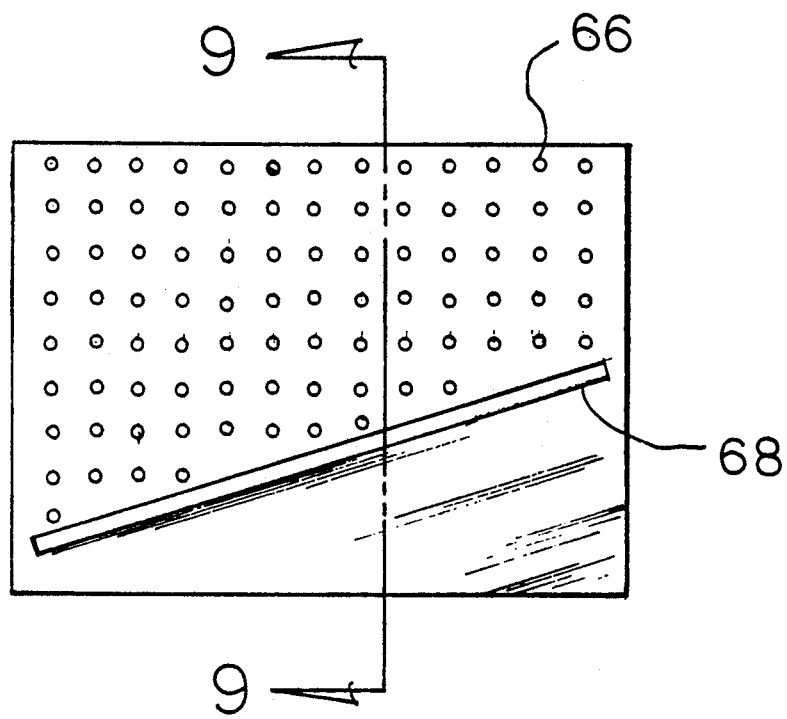
FIG. 8 is a cross-sectional view of the invention as viewed along the line 8—8 in FIG. 7.
Figure 9:
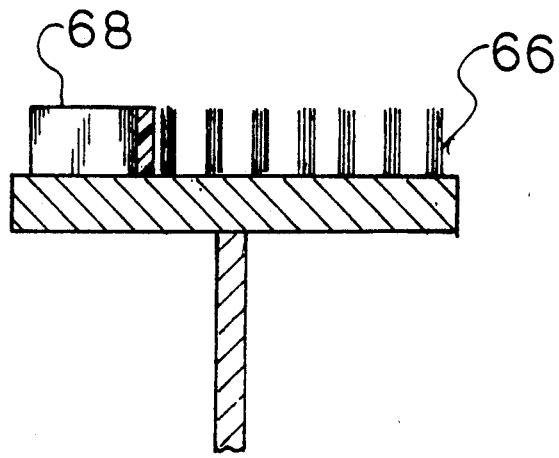
FIG. 9 is a cross-sectional view as viewed along the line 9—9 in FIG. 8.

Viewing FIGS. 8 and 9 in conjunction with FIG. 7, it can be seen that the brush 64 includes a plurality of rigid bristles 66 which serve to loosen and brush away debris from a roller 22, and further includes a flexibly moveable, angulated scraper 68 which serves to capture the loosened debris and direct it to an outside edge of the roller, thereby to prevent an accumulation of dirt and other residue within the roller guide track 36.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved escalator broken roller detector comprising:
   support means;
   first sensor/detector means mounted to said support means and positionable on a first side of said escalator, said first sensor/detector means being mounted to said support means on opposed sides of a movable escalator roller, said first sensor/detector means being further mounted on a first flexibly moveable arm and being selectively positionable on opposed sides of a roller;
   second sensor/detector means mounted to said support means and positionable on a second side of said escalator, said second sensor/detector means being mounted to said support means on opposed means of a moveable escalator roller, said second sensor/detector means being further mounted on a second flexibly moveable arm and being selectively positionable on opposed sides of a roller; and
   pulse generating means for providing a timed signal between said first and second sensor/detector means, said timed signal being timed to coincide with a selective positioning of an escalator roller, thereby to detect said selective positioning of said roller so as to indicate a presence thereof.

2. The new and improved escalator broken roller detector as described in claim 1, and further wherein said first flexibly moveable arm includes a rigid U-shaped portion to which a roller cleaning brush is attached.

3. The new and improved escalator broken roller detector as described in claim 2, wherein said roller cleaning brush is selectively moveable into and out of engagement with a moveable roller.

4. The new and improved escalator broken roller detector as described in claim 3, wherein said roller cleaning brush includes rigid bristles for cleaning a moving surface of said roller.

5. The new and improved escalator broken roller as described in claim 4, and further wherein said roller cleaning brush includes an angulated scraper designed to selectively direct loose debris from a moving surface of said roller, thereby to prevent debris accumulation in a roller guide track.

* * * * *